(12) United States Patent
Preuss et al.

(10) Patent No.: US 9,574,962 B2
(45) Date of Patent: Feb. 21, 2017

(54) HYDRAULIC ATTACHMENT

(71) Applicants: Oliver Preuss, Dortmund (DE); Stefan Lohmann, Muelheim (DE); Colin Dirr, Hattingen (DE); Oleg Knjazev, Dorsten (DE); Martina Jaekel, Gelsenkirchen (DE); Uwe Autschbach, Oberhausen (DE); Markus Mellwig, Hagen (DE)

(72) Inventors: Oliver Preuss, Dortmund (DE); Stefan Lohmann, Muelheim (DE); Colin Dirr, Hattingen (DE); Oleg Knjazev, Dorsten (DE); Martina Jaekel, Gelsenkirchen (DE); Uwe Autschbach, Oberhausen (DE); Markus Mellwig, Hagen (DE)

(73) Assignee: CONSTRUCTION TOOLS GMBH, Essen (DE)

( * ) Notice: Subject to any disclaimer, the term of this patent is extended or adjusted under 35 U.S.C. 154(b) by 0 days.

(21) Appl. No.: 14/374,767

(22) PCT Filed: Mar. 19, 2013

(86) PCT No.: PCT/DE2013/000158
§ 371 (c)(1),
(2) Date: Jul. 25, 2014

(87) PCT Pub. No.: WO2013/149608
PCT Pub. Date: Oct. 10, 2013

(65) Prior Publication Data
US 2015/0027569 A1     Jan. 29, 2015

(30) Foreign Application Priority Data

Apr. 5, 2012  (DE) .......................... 10 2012 006 933
Jun. 20, 2012 (DE) .......................... 10 2012 012 299

(51) Int. Cl.
*F17C 13/02*   (2006.01)
*E02F 9/26*   (2006.01)
(Continued)

(52) U.S. Cl.
CPC ................. *G01L 19/10* (2013.01); *B25D 9/00* (2013.01); *B25D 9/12* (2013.01); *E01C 23/00* (2013.01);
(Continued)

(58) Field of Classification Search
CPC   B25D 2250/221; E02F 9/226; F16K 37/0008; F16K 37/0066; F17C 13/025; G01L 19/10; G01L 7/16; Y10T 137/8326
See application file for complete search history.

(56) References Cited

U.S. PATENT DOCUMENTS 1,631,714 A * 6/1927 Wellman ................. G01L 7/16
116/272
2,297,378 A * 9/1942 Wittenberg ............. A47J 27/09
137/534
(Continued)

FOREIGN PATENT DOCUMENTS

DE         202009007316 U    8/2009
FI         WO 2011077001 A1 * 6/2011 ............... B25D 9/00

*Primary Examiner* — Marina Tietjen
*Assistant Examiner* — Seth W Mackay-Smith
(74) *Attorney, Agent, or Firm* — Andrew Wilford (57) ABSTRACT

The present invention relates to a hydraulic attachment comprising a hydraulic circuit, the attachment being a construction or demolition tool, in particular a hydraulic breaker, demolition shears, scrap shears, a pulverizer, a gripper, a crusher bucket or a compactor, which can be mechanically connected to a support device and hydraulically connected to the hydraulic system of the support device. In order to enable the hydraulic circuit to be opened quickly and safely within an attachment and, in particular, to make it possible to display the presence of a particular (Continued)

pressure level within a hydraulic attachment and to determine whether a dangerous residual pressure is present in the system, a hydraulic attachment is proposed that has a residual pressure display (40) which is connected to the hydraulic circuit of the attachment in a detachable or non-detachable manner.

11 Claims, 3 Drawing Sheets (51) Int. Cl.
G01L 19/10 (2006.01)
E02F 5/32 (2006.01)
E02F 9/22 (2006.01)
F15B 5/00 (2006.01)
F15B 20/00 (2006.01)
B25D 9/12 (2006.01)
B25D 9/00 (2006.01)
E01C 23/00 (2006.01)
E04G 23/08 (2006.01)
G01L 7/16 (2006.01)
F15B 21/00 (2006.01)

(52) U.S. Cl.
CPC .............. *E02F 5/323* (2013.01); *E02F 9/226* (2013.01); *E02F 9/2275* (2013.01); *E04G 23/08* (2013.01); *F15B 5/00* (2013.01); *F15B 20/00* (2013.01); *F15B 21/005* (2013.01); *G01L 7/16* (2013.01); *B25D 2250/221* (2013.01); *Y10T 137/8326* (2015.04)

(56) References Cited

U.S. PATENT DOCUMENTS

| | | | | |
|---|---|---|---|---|
| 2,635,630 A * | 4/1953 | Cornelius | ............... | A47J 27/09 116/272 |
| 3,203,246 A * | 8/1965 | Horwitt | ..................... | G01L 7/16 116/272 |
| 3,286,726 A * | 11/1966 | Guy | ................... | G05D 16/0663 137/505.18 |
| 3,910,120 A * | 10/1975 | Martin | ..................... | G01L 7/16 73/146.3 |
| 4,168,621 A * | 9/1979 | Kreitenberg | ............ | G01M 3/26 138/90 |
| 4,199,993 A * | 4/1980 | Graczyk | ................... | G01L 7/16 73/744 |
| 4,265,164 A * | 5/1981 | Maeda | ..................... | G01L 7/16 91/321 |
| 4,445,531 A * | 5/1984 | Powell | .................. | F16K 17/105 137/489 |
| 4,625,754 A * | 12/1986 | Wilson | ..................... | F16J 13/08 137/315.32 |
| 4,794,949 A * | 1/1989 | Sakai | ..................... | G01L 19/12 137/557 |
| 5,014,786 A * | 5/1991 | Kobayashi | ............... | G01L 19/12 116/266 |
| 5,671,775 A * | 9/1997 | Miller | ..................... | F16K 1/305 137/312 |
| 5,810,115 A * | 9/1998 | Mismas | ................ | F16K 27/003 137/557 |
| 6,032,537 A | 3/2000 | McLaren | | |
| 6,318,407 B1 * | 11/2001 | Kohn | ..................... | F16K 1/304 137/557 |
| 6,510,902 B1 | 1/2003 | Prokop | | |
| 6,837,319 B2 * | 1/2005 | Dvorak | ................. | E02F 9/2275 180/324 |
| 7,367,256 B2 * | 5/2008 | Fatemi | .................... | E02F 3/365 91/1 |
| 8,020,799 B2 * | 9/2011 | Muraoka | ................ | E02F 3/3654 241/101.73 |
| 8,704,507 B2 * | 4/2014 | Oksman | ................... | B25D 9/00 173/90 |
| 2006/0231013 A1 * | 10/2006 | Lane | ...................... | G01L 7/166 116/272 |
| 2007/0261403 A1 * | 11/2007 | Eppler | .................... | F15B 11/08 60/468 |

* cited by examiner

Fig. 3

HYDRAULIC ATTACHMENT

CROSS REFERENCE TO RELATED APPLICATIONS

This application is the US-national stage of PCT application PCT/2013/000158 filed 19 Mar. 2013 and claiming the priority of German patent application 102012006933.2 itself filed 5 Apr. 2012 and German patent application 102012012299.3 itself filed 20 Jun. 2012.

The present invention relates to a hydraulic attachment that is a construction or demolition tool, in particular a breaker, demolition pincers, scrap pincers, a pulverizer, a grab, a crusher bucket or a compactor, having a hydraulic circuit that can be mechanically connected to a support device and hydraulically connected to the hydraulic system of the support device.

Hydraulic attachments can be attached to a large number of different support devices from a very wide range of manufacturers. It is often necessary to open the oil circuit, both during attachment and removal and when switching between functional modes of the attachment or expanding the installation (e.g. by adding a continuous lubrication pump). For this purpose, the hydraulic oil pressure must first be lowered to the ambient level to allow safe opening.

Lowering the hydraulic pressure to the ambient level is possible only in a process involving the interplay of the support device and the attachment. Owing to the large number of support devices, it is not possible for manufacturers of attachments to give standard advice on lowering the hydraulic pressure to the ambient level and thus to tell the user in a universally applicable way how the pressure can be lowered. On the contrary, apart from the regular equipment supplied as standard by the manufacturer of the support device, the procedure is heavily dependent on the specific hydraulic installation of the support device and is specific to the area of application.

Thus, it is not possible either for the manufacturer of the support device or for the manufacturer of the attachment to give clear instructions or a clear description to the user as to how the system pressure in the overall machine consisting of the support device and an attachment can be lowered safely to ambient pressure. In the case of unfavorable hydraulic installations, e.g. in the case of a return via a free valve section of the support device and no direct return to the tank, it is possible in some cases for a higher pressure level to be present in the circuit for several hours. The user has no means of knowing whether there is still residual pressure in the circuit or not. In addition, there is also the possibility, owing to accidentally closed shutoff valves or prematurely divided hose couplings for example, that incorrect behavior by the user will lead to residual pressure being trapped in the attachment, even though the pressure measured at the support device has already fallen to the ambient level. Oil still present in the attachment and is under high pressure can then escape in an uncontrolled manner in the form of an oil jet when hydraulic lines are detached, and this can lead to personal injury and environmental pollution.

A similar problem has already been addressed in DE 202009007316, where an attachment having hydraulic equipment for hydraulic construction machines with hydraulic hoses, which can be connected to the hydraulic system of the construction machine (as support vehicle) by hose couplings, is described. It is furthermore explained that, when an attachment has been separated from the hydraulic construction machine and the hose couplings have thus been divided, the hydraulic hoses thereof are filled with hydraulic oil. In the event of irradiation by the sun, an excess pressure can form within the hydraulic circuit of the attachment closed due to the closed hose couplings, and this excess pressure is not detected by the user. It is the object of the apparatus according to DE 202009007316 to avoid the formation of excess pressure within the hydraulics of the equipment and, for this purpose, the proposal is for an open hydraulic tank arranged on the attachment and having hose coupling halves. After the hose couplings between the support device and the attachment have been divided, the user has to connect the attachment-mounted hoses to the hydraulic tank via the hose coupling halves.

The disadvantage with the known prior art is that the pressure prevailing within an attachment cannot be detected by the user, and therefore it is not possible to open the hydraulic circuit without risk. It is furthermore disadvantageous that pressure relief is not possible in all cases, while the known possibilities lead to increased installation space, costs and expenditure on maintenance, and that dirt can enter the hydraulic circuit. The additional components, such as hydraulic tanks, hose couplings, venting means and discharge valve require a considerable amount of installation space, and this is not available on many attachments. Owing to rough usage on construction sites and in quarries, all components that are additionally fastened to an attachment are subject to a high risk of being damaged. Since additional oil is drawn into the attachment from the hydraulic tank as the oil charge in the attachment cools down, there is the risk that either air or contaminated oil will enter the hydraulic circuit of the attachment from the hydraulic tank. Depending on the capacity of the hydraulic tank, it must be emptied at regular intervals. The solution comprising a hydraulic tank offers no protection from residual pressure in the attachment if there is still pressure in the circuit when the hose couplings or shutoff valves between the attachment and the support device are divided or closed. Since the hose coupling halves or shutoff valves seal off the respective line hermetically in the divided state, no oil can escape, the pressure remains trapped and the hose coupling halves cannot be connected to the hose coupling halves of the hydraulic tank since too high a force is required to open the stop valves of the hose coupling halves against the trapped pressure.

It is therefore the object of the present invention to allow risk-free opening of the hydraulic circuit within an attachment and, in particular, to eliminate the disadvantages mentioned. The intention is furthermore preferably to provide a simple and reliable means of being able to detect whether there is a residual pressure in the hydraulic circuit of an attachment.

This object is achieved by the hydraulic attachment as claimed in claim 1 that, according to the invention, has a residual pressure indicator connected to the hydraulic circuit of the attachment in a detachable or non-detachable manner. This provides the possibility of indicating the presence of a pressure above a limit in the hydraulic circuit of the attachment. The residual pressure indicator serves as an indicating element by means of which the user has the possibility of detecting whether the pressure has fallen to the extent that the oil circuit can be opened without danger during attachment and removal and when switching between functional modes of the attachment, when expanding the installation, e.g. with a continuous lubricating pump, or during maintenance work, thereby as far as possible avoiding expensive and unnecessary down times of the attachment.

Moreover, the risk posed by possible incorrect use, e.g. the closure of shutoff valves or the division of hose couplings while the pressure is still high, is avoided because the pressure is measured and indicated directly in the attachment by the indicating element. In contrast to pressure indicators or pressure measuring points on the support device, the residual pressure indicator is connected directly to the hydraulic circuit of the attachment, without selector valves, shutoff valves or hose couplings in between, and operates independently of the support device installation, thereby ensuring that the indicated result is not affected by the operating position of valves and by the coupling state of hose couplings. No further measuring instruments are required. The device according to the invention eliminates the risk that fluid under high pressure can escape and cause personal injury during maintenance or adjustment work.

Preferred embodiments of the present invention are described below and in the dependent claims.

According to a first preferred embodiment of the invention, it is envisaged that the residual pressure indicator is a direct acting device, preferably having a measuring and indicating piston acted upon directly by the hydraulic pressure. The residual pressure indicator is furthermore preferably integrated into the attachment and only an outer surface of the residual pressure indicator, on which an indicating element is arranged, is visible from the outside. A residual pressure indicator of this kind is robust and is therefore particularly well-suited to use on hydraulic attachments for the construction, demolition and mining industries that are preferably designed as hydraulic impact devices or hydraulic demolition pincers. As an alternative to an indicating piston, it is also possible for the linear motion of the measuring piston to be converted into a rotary motion of an indicating element, e.g. a rotating disk that has two markings of different colors (red/green or the like). The linear motion, which is dependent on the hydraulic pressure and brings about the deflection of an indicating element, can also be produced by a measuring diaphragm rather than by a measuring piston.

The residual pressure indicator preferably has a main body screwed by an external thread into a location hole provided with an internal thread, where the location hole is introduced into a component of the hydraulic attachment. According to another preferred embodiment of the invention, it is envisaged here that the residual pressure indicator has a measuring piston having a rod, a piston collar and a stop collar, the measuring piston is arranged in a hole in the main body and can move along the longitudinal axis within the hole against the force of a spring. A device of this kind can be mounted in an uncomplicated way on the attachment or in a component of the attachment and is well protected from external mechanical influences. If the residual pressure indicator is used on a hydraulic breaker, it can be arranged in the impact mechanism housing, on the support housing accommodating the impact mechanism or in the housing of a hydraulically driven lubricating pump secured on the impact mechanism housing or the support housing.

According to another advantageous embodiment of the invention, the hole is connected to the hydraulic circuit of the attachment by a measuring hole, with the result that the pressure prevailing in the hydraulic circuit acts on the measuring piston. The rod therefore protrudes further out of the main body with increasing pressurization of the measuring piston and retracts into the main body when the pressure is reduced. By means of the length of the rod protruding from the main body, the user can read off directly whether risk-free opening of the hydraulic circuit is possible. To limit the displacement travel of the measuring piston in at least one direction, the measuring piston has a stop collar. The residual pressure indicator is preferably built into the impact mechanism housing, in particular into the cylinder of a hydraulic breaker.

Specific embodiments of the present invention are explained below with reference to the figures, in which.

Fluid-pressure operated impact devices are used in hydraulic breakers serving, in particular, to break up rocks, concrete or other construction materials, and in hammer drills serving to drill holes into rocks and other construction materials, and are in most cases used as accessories or attachments for support devices such as excavators, loaders, tracked vehicles or other construction and mining machines.

Figure 1:
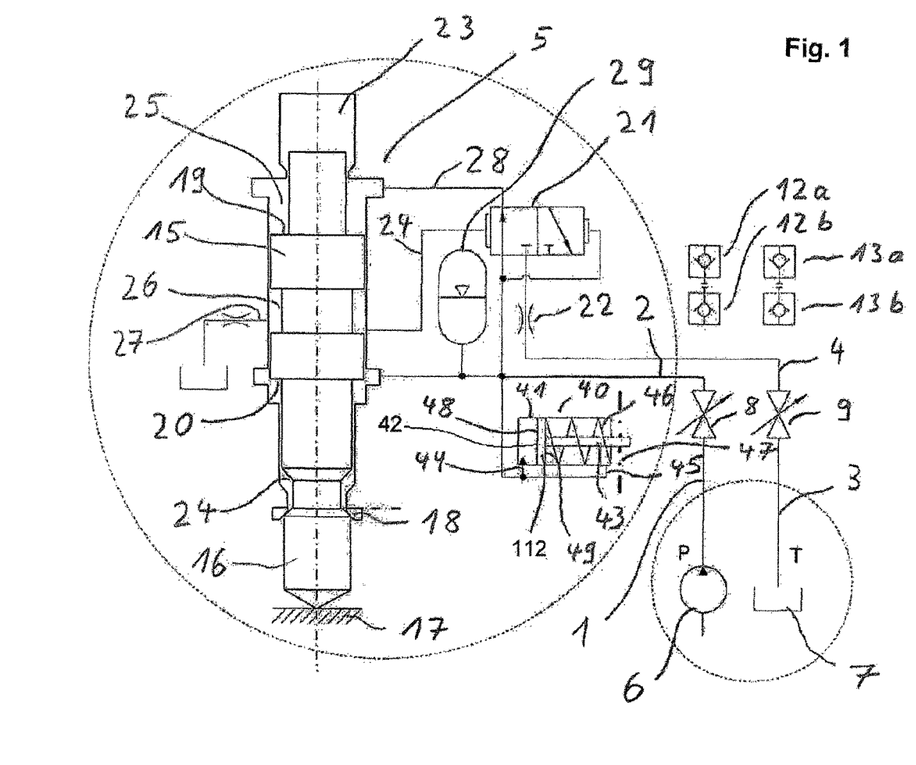
FIG. 1: shows a schematic illustration of a hydraulic breaker having an impact device.

FIG. 1 shows that the impact mechanism 5 of a hydraulic breaker is hydraulically connected to the pump 6 and the tank 7 of a support device, e.g. an excavator, via a pressure line 1, 2 and a tank line 3, 4, respectively. On the excavator there is a valve, to which the line 1 to the pump can be connected in order to supply the impact mechanism with pressurized oil for operation or with which the connection is divided in order to stop operation of the impact mechanism. This valve is not shown in FIG. 1. In each of the lines of the excavator that lead to the impact mechanism there is usually a shutoff valve 8, 9 in order to prevent hydraulic fluid from escaping when the hydraulic connection is divided to remove the hydraulic breaker from the excavator. Instead of the shutoff valves or in addition to the shutoff valves, hose couplings can be fitted in the lines, each comprising two coupling halves 12a, 12b and 13a, 13b respectively, which have stop valves that prevent hydraulic fluid from escaping when the couplings are divided. The couplings are shown in the divided state, in which the stop valves are closed. The couplings shown are shown separately, not connected to the hydraulic circuit.

The impact mechanism consists of a cylinder housing in which an impact piston 15 is guided, of a cylinder head and of a breaker bottom part, in which the bit 16 or inserted end is mounted by wearing bushes. Only the simplified inner contour of the cylinder housing and of the head are shown. In normal operation, the support device presses the impact mechanism in the direction of the material 17 to be worked, and therefore the impact mechanism is supported on a bearing surface of the upper end of the bit via the bit stop 18 arranged in the housing and the lower end of the bit is pressed against the material to be worked.

In normal operation, the hydraulically driven impact piston strikes that end of the bit located in the impact mechanism at the end of each impact stroke and transmits its kinetic energy to the bit. The energy introduced into the bit gives rise to a high impact force transmitted by the bit to the material and brings about the destruction thereof.

The impact piston 15 is embodied as a differential piston, i.e. it has two opposite annular driving surfaces 19, 20 of different sizes. The lower driving surface 20, by means of which the return stroke is initiated when pressurized, is subjected continuously to a predetermined operating pressure available in the pressure line 2 during operation. The upper driving surface 19, by means of which the impact stroke is initiated by pressurization, is subjected to the operating pressure or relieved to the tank pressure, depending on the position of a control slide valve 21. The impact stroke is possible because the upper annular driving surface 19 is larger than the lower 20, so that when both surfaces are subjected to the operating pressure there is a resultant force in the impact direction. During the "impact stroke", the moving piston displaces the oil displaced by the small, lower driving surface in the direction of the larger, upper driving surface 19 of the piston, to which surface the oil coming from the pump 6 also flows. During the return stroke, the oil flows from the pump 6 exclusively in the direction of the smaller-area lower driving surface 20, whereas the oil from the larger-area upper driving surface 19 is discharged to the tank 7 via a check valve 22 that ensures smooth operation of the breaker.

The impact mechanism furthermore has a gas space 23, namely a space under gas pressure, into which the upper end face of the piston projects. The gas pressure in this space exerts an additional force acting in the direction of the impact stroke on the piston. Impact mechanisms can also be embodied without a gas reservoir. The piston part situated at the other end of the piston, including the end or impact surface there, projects into an "impact space" 24 connected to atmosphere.

The control slide valve 21 already mentioned above, which is preferably located in the cylinder head of the impact mechanism, either connects the upper driving surface 19 of larger surface area to the pressure line 2, with the result that the operating pressure is applied there, or relieves said surface to the tank 7 via the tank line 4 during the return stroke, depending on the operating position.

Like the impact piston, the control slide valve 21 can also have two driving surfaces, wherein a first surface, the return surface, is subjected continuously to the operating pressure by the pressure line and an opposing second surface of larger area, the control surface, is either subjected to the operating pressure or relieved to the tank pressure. Owing to the difference in size of the two surfaces, the control slide valve can be pushed into one of its end positions when the appropriate pressure is applied to the surfaces.

The control surface is connected to a reversal line 24, which opens in such a way into the cylinder space 25 in which the impact piston is guided that it is subjected to the operating pressure or relieved to the tank pressure, depending on the piston position. In the lower reversal position, in which the impact piston strikes the tool in the normal operating state, the end of the reversal line 24 is connected via a circumferential groove 26 arranged between the driving surfaces of the impact piston to a tank line 27 that likewise opens into the working cylinder in which there is a low pressure prevailing, as a result of which the control surface of the control slide valve is relieved to the tank 7 and the control slide valve assumes a first end position (return stroke position) since the operating pressure is applied to the return surface of the control slide valve and produces a corresponding return force. The tank lines 27 and 4 are combined within the impact mechanism and open into a common tank on the support device, said tank being represented as two tanks here for the sake of clarity. In the return stroke position, the control slide valve connects the upper driving surface 19 of the impact piston to the tank line 4 via the alternating pressure line 28. Owing to the constant operating pressure applied to the lower driving surface 20 of the impact piston, the impact piston is pushed upward counter to the direction of the impact stroke. Via a check valve 22, the oil displaced by the upper piston driving surface flows in a restricted manner to the tank, thereby maintaining a pressure level required for smooth operation on the upper driving surface during the return stroke.

Some types of hydraulic breaker are fitted with a hydraulic pressure accumulator 29, which are provided for storing pressurized hydraulic oil and reduce pressure fluctuations caused by time variations in oil consumption by the impact mechanism.

After the hydraulic oil supply of the impact mechanism is switched off, i.e. after separation from the pump, the pressure still prevailing in the impact mechanism is dissipated by leaks at the valves of the support device, the time required for this depending on the leakage gaps and the oil viscosity and possibly taking a very long time, precisely in the case of small gaps and cold, viscous oil. Precisely when the impact mechanism has a hydraulic pressure accumulator 29, a relatively large amount of oil must be dissipated via leakage points before the pressure is dissipated. If the shutoff valves 8 and 9 are closed or the hose couplings 12*a*, 12*b*, 13*a* and 13*b* are divided before complete pressure dissipation, the hydraulic circuit of the impact mechanism is shut off and the pressure remains trapped in the circuit.

In order to detect the continued presence of such pressure, a residual pressure indicator 40 is connected to the pressure line 2. The residual pressure indicator 40 consists of a measuring cylinder 41, which has a hole, into which a measuring piston 42 having a rod 43 and a piston collar 112 is fitted. The piston collar divides the measuring cylinder into two cylinder chambers that are connected to the pressure line 2 by connection lines 44, 45. In the annular cylinder chamber situated on the right of the piston collar there is a spring 46 that pushes the measuring piston and the rod attached thereto into the rest position when the pressure line and hence the cylinder chambers are depressurized. In the rest position, the rod is retracted into the measuring cylinder to such an extent that it does not project beyond the component surface of the impact mechanism or the component surface of the component forming the measuring cylinder represented as a chain-dotted line 47. The pressure prevailing in the pressure line is passed into the two cylinder chambers via connection lines 44 and 45 and acts equally on the circular surface 48 and on the opposing annular surface 49 of the piston collar. Since the circular surface 48 has a larger area than the annular surface, there is an effective resultant differential force that pushes the measuring piston in the direction of the component surface, even though the forces are opposed. Opposed to this movement and the resultant force is the force produced by the spring. If the resultant force exceeds the force of the spring, owing to the oil pressure, the measuring piston and the rod that forms the indicating element move in the direction of the component surface, with the result that the rod projects visibly relative to the component surface. The projection and visibility of the rod indicates that a predetermined pressure level has been exceeded in the hydraulic circuit of the impact mechanism and that the hydraulic circuit cannot be opened without danger. The dimensions of the piston collar and those of the rod and the geometrical dimensions of the spring are chosen in such a way that the rod then projects and is visible when a critical pressure level is exceeded and it is no longer possible to ensure that the hydraulic circuit can be opened without danger. If the rod does not project, the pressure level in the hydraulic circuit is so low that an escape of hydraulic fluid no longer represents a significant danger. The critical pressure at which the rod projects is between 1 and 6 bar. Depending on the spring characteristic, the rod will project by a short length from the housing at a first pressure level and will project further at another, somewhat higher pressure level, only then being clearly visible. Seals on the rod and, optionally, on the piston collar for preventing leaks to atmosphere or leaks between the cylinder chambers are not shown.

The rod can be embodied in such a way that it has colored markings or markings in the form of grooves or projections that more clearly indicate the reaching of a pressure level and enable a precise pressure level to be indicated.

It is also possible for the cylinder chamber in which the rod and the annular surface 49 are situated not to be connected to the pressure line but to be filled with air and shut off, connected to the tank line or connected to atmosphere. Thus, only the force resulting from the circular surface 48 connected to the pressure line and the spring force would act on the measuring piston.

The rod of the measuring piston can act on a pin- or piston-shaped indicating element arranged in such a way that it is not the rod but the indicating element moved by the rod that can project relative to the component surface.

The residual pressure indicator 40 is preferably continuously connected to a pressure line of the hydraulic circuit of the impact mechanism, in which the pressure prevailing in the pressure line 2 is available. It is also possible to arrange between the pressure line and the residual pressure indicator a valve that has to be actuated manually in order to activate the residual pressure indicator, this having the advantage that, during the operation of the impact mechanism, when the pressure level in the hydraulic circuit alternates frequently between the high pump pressure and the low tank pressure, the measuring piston is not moved repeatedly but only when required. Through appropriate arrangement of the rod of the measuring piston and of the spring, the residual pressure indicator can also be embodied in such a way that the indicating element projects beyond the component surface in the depressurized rest position and retracts behind the component surface when a certain pressure level is exceeded and risk-free opening of the hydraulic circuit is no longer guaranteed.

Figure 2:
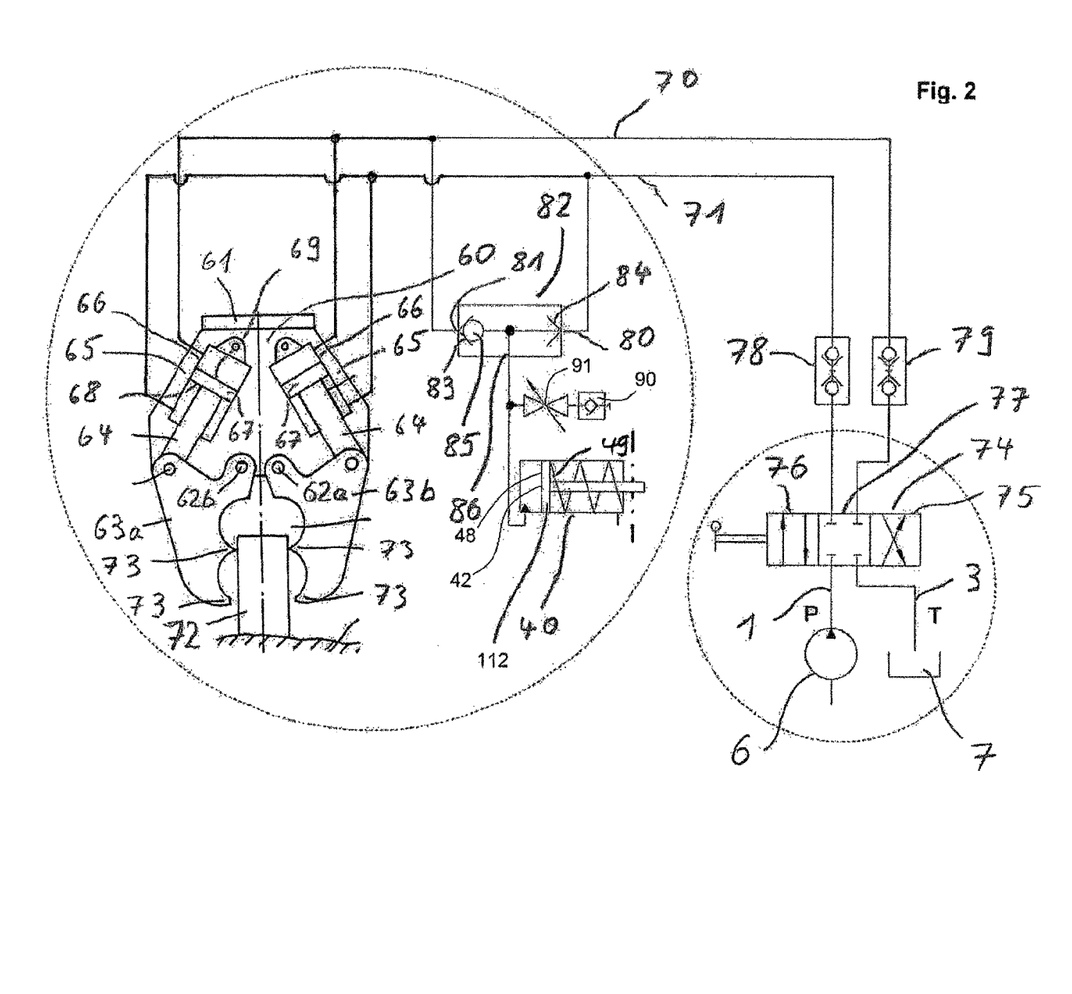
FIG. 2: shows a schematic illustration of demolition pincers.

FIG. 2 shows a specific embodiment of the invention in schematic representation, this being implemented on demolition pincers in the illustrative embodiment shown.

Demolition pincers, also referred to as demolition shears, have tool arms, of which at least one arm can be pivoted backward and forward between an open and a closed position by at least one hydraulic cylinder. The demolition pincers shown in FIG. 2 have a housing 60 that can be attached to the boom of an excavator via a connecting plate 61. Two arms 63a, 63b are pivotably attached to the housing by two pivots 62a, 62b. Pivotally attached to each arm is the piston rod 64 of a hydraulic cylinder 65, the cylinder tube 66 of which is pivotally attached to the housing. Each hydraulic cylinder has a piston 67 secured on the piston rod and that divides the cylinder into two chambers. On the piston rod side, the piston has an annular driving surface 68 and, on the opposite side, it has a circular driving surface 69. The identically shaped surfaces of the two cylinders are each connected to one another by hydraulic lines 70 and 71 respectively. If hydraulic oil is supplied to the circular piston surfaces 69 and hydraulic oil can flow away from the annular piston surfaces 68, the piston rods extend out of the cylinders and pivot the arms in such a way that the distance between the arms decreases and the arms are pivoted into the closed position. Material 72 to be broken away, such as concrete, around which the pincer arms are positioned, is destroyed by this movement since the cylinder force is transmitted to the arms and further to the material. The arms have teeth 73 in order to achieve a high surface pressure at the contact point between the arm and the material. In order to pivot the arms back into the open position and increase the distance between the arms, oil is then supplied to the annular piston surfaces 68 and carried away from the circular driving surfaces 69. The supply and removal of oil to and from the piston surfaces take place via a control valve 74 arranged on the support device and can be mechanically actuated directly by the user or indirectly via a hydraulic or electric control system. In a first operating position 75, the circular driving surfaces are connected to the line 1 coming from the pump 6, and the annular driving surface is connected to the line 3 leading to the tank, as a result of which the arms are pivoted into the closed position. In the second operating position 76, the annular driving surfaces are connected to the line 1 coming from the pump 6, and the circular driving surface is connected to the line 3 leading to the tank, as a result of which the arms are pivoted into the open position. In a third operating position 77 of the excavator valve, the central position, the connections of the cylinder spaces to the pump and the tank are shut off. Arranged in the lines 70 and 71 between the demolition pincers and the excavator valve are hydraulic hose couplings 78, 79, which are here illustrated in the coupled state, in which the stop valves of the hose couplings are open and allow a free flow of oil. The two inlets 80, 81 of a shuttle valve 82 are connected respectively to lines 70 and 71. The shuttle valve has two opposite valve seats 83, 84, between which a valve element 85 in the form of a ball or of a piston is arranged in a movable manner. Respective hydraulic inlets are connected to each of the valve seats, and a hydraulic outlet 86 is arranged between the valve seats. If the line 71 leading to the annular driving surfaces is connected to the pump and the line 70 leading to the circular driving surfaces is connected to the tank via the excavator valve, a high pressure is available in line 71 and thus at inlet 80 and a low pressure is available at inlet 81. The valve element 85 is pushed into seat 83 by this pressure difference between the lines and prevents oil from flowing out of line 71 into line 70. Owing to the fact that seat 84 is not closed by the valve element, a connection is established between line 71 and the outlet 86. A residual pressure indicator 40 is connected to the outlet 86 and its measuring piston 42 is subjected at the circular surface 48 to the pressure available in line 71 or at the outlet 86. The chamber on the same side as the annular surface 49 is filled with compressible air and is shut off. A seal (not shown) on the piston collar prevents oil or air from flowing between the chambers. The shuttle valve ensures that the highest pressure prevailing in the cylinder chambers of the hydraulic cylinder is passed to the measuring piston 42 in each case. Arranged on the same side as the annular surface there is furthermore a spring that pushes the measuring piston into its rest position when there is no pressure or only a little pressure on the circular surface.

Instead of a residual pressure indicator having a shuttle valve, it is also possible to use two residual pressure indicators without a shuttle valve, wherein one residual pressure indicator in each case is hydraulically connected to the respective piston surfaces 68 and 69 of identical area.

Figure 3:
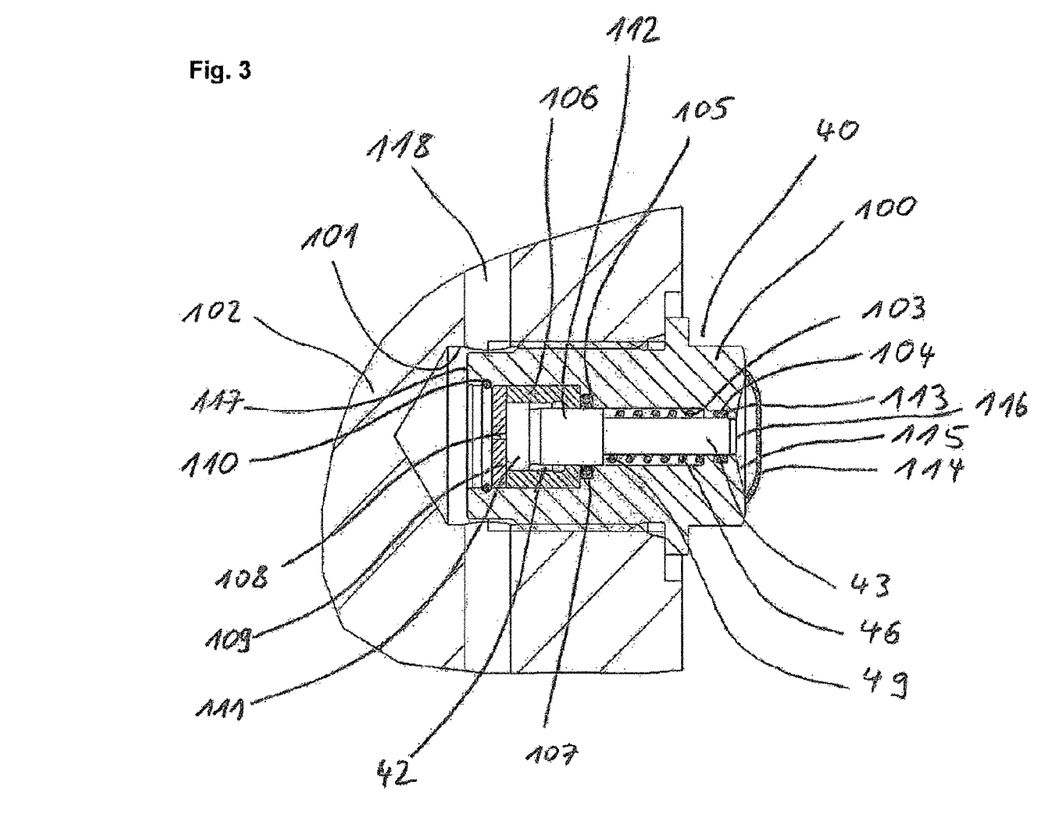
FIG. 3: shows a schematic detail view of a residual pressure indicator.

Finally, a specific embodiment of a residual pressure indicator is shown in FIG. 3.

The residual pressure indicator 40 consists of a main body 100 screwed by an external thread into a location hole 101 provided with an internal thread, wherein the location hole is situated in a component 102 of the attachment, e.g. in the cylinder head of an impact mechanism of a hydraulic breaker. The main body contains the measuring cylinder that has a stepped hole 103, in which there are seal grooves 104, 105. Inserted into the hole is a seal sleeve 106 that delimits the seal groove 105 axially in one direction and allows easy insertion and changing of the seal 107 by removing the seal sleeve from the hole. The seal sleeve is secured against axial displacement in the hole by a washer 109 provided with a restrictor hole 108 and by a retaining ring 110. Inserted into the hole is the measuring piston 42 that has a rod 43, a piston collar 112 and a stop collar 111. The stop collar has a larger diameter than the hydraulically acting piston collar 112 of the measuring piston and its outside diameter is designed in such a way that a gap that allows the passage of oil is obtained between the hole and the stop collar and a hydraulic connection is thus established between the spaces on both sides of the stop collar. The seal 107 prevents oil or air flowing between the spaces on both sides of the piston collar 112. A spring 46 is arranged in an air-filled space around the rod and exerts a force on the annular surface 49 of the piston collar and returns it into the rest position, in which the stop collar rests against the washer. In this position, the outer end face 116 of the rod is flush with the concave outer end face 115 of the main body, i.e. the rod does not project beyond the main body in the rest position, in which there is no pressure in the hydraulic circuit or only a pressure that represents no risk. A dirt scraper 113 that prevents the penetration of dirt and moisture into the guiding gap between the rod and the main body, is inserted in the seal groove 104. However, the dirt scraper is embodied in such a way that it is permeable to air and prevents a pressure buildup within the air-filled space in which the spring is situated. A transparent, flexible cap 114, which provides another safeguard against the penetration of dirt and moisture, is secured on the end of the main body.

That end 117 of the main body that faces the base of the hole 103 is connected by a measuring hole 118 to a line (not shown) of the hydraulic circuit in which the pressure is to be monitored. Via the restrictor hole, the pressure from the measuring hole can act on the measuring piston and is thus available within the seal sleeve and on both sides of the stop collar. The hydraulic force opposed to the force of the spring results from the cross-sectional area of the piston collar 112 and the pressure applied to this cross-sectional area. If the force produced by the pressure exceeds the force of the spring, the measuring piston is moved in the direction of the cap, and the tappet extends out of the main body until the stop collar comes to rest on the seal sleeve. The tappet thus projects from the main body, a clear sign that pressurized oil is present in the measuring hole and in the hydraulic circuit connected thereto and that the hydraulic circuit cannot be opened without danger. If the pressure falls below a certain pressure at which the spring force exceeds the hydraulic force, the measuring piston moves in the opposite direction until the rod is no longer projecting, a clear sign that there is no longer any pressure in the hydraulic circuit of the attachment or that the pressure has fallen to a safe level. Embodiments in which the spring preload can be changed by a thread element, for example, and thus the pressure level at which the rod projects can be adjusted are possible.

As an alternative, the spring can also be arranged in the space of the seal sleeve, around the piston collar, thus being clamped between the annular surface of the stop collar and the annular bottom surface of the hole in the seal sleeve. In this case, the rod can have the same diameter as the piston collar.

If the pressure measuring device is used on attachments such as demolition pincers, pulverizers, or grabs that have hydraulic cylinders with in each case two separate cylinder chambers that can be hydraulically pressurized separately, the residual pressure indicator is connected via a shuttle valve to the two cylinder chambers of the hydraulic cylinder or cylinders provided to pivot the pincer arms, the pulverizer arm or the grab buckets. The shuttle valve has two opposite valve seats, between which a valve element is arranged in a movable manner. A hydraulic inlet is connected to each of the valve seats and a hydraulic outlet is arranged between the valve seats. The shuttle valve ensures that the highest pressure prevailing in one of the two cylinder chambers is passed to the measuring piston of the residual pressure indicator in each case but not to the other cylinder chamber at the lower pressure.

If the pressure measuring device is used for a compactor having a hydraulic rotary motor, the residual pressure indicator is connected to the two hydraulic ports of the compactor via a shuttle valve. The shuttle valve ensures that the highest pressure prevailing in one of the two ports is passed to the residual pressure indicator in each case.

If, in addition to the hydraulic cylinders provided for pivoting, the attachment has further hydraulic circuits for supplying further drives, e.g. a torque motor drive for turning the attachment relative to the boom of the support device, the pressure of further hydraulic circuits can also be passed to the residual pressure indicator by a cascade-type arrangement of shuttle valves, with the result that the highest pressure prevailing in one of the hydraulic circuits of the attachment is passed to the residual pressure indicator.

In addition, the residual pressure indicator or the attachment can be fitted with a relief valve 91 and optionally with a hose coupling half 90 that enables a hose to be connected to the attachment and oil to be discharged from the attachment into a collecting vessel through manual opening of the relief valve in order to dissipate the pressure in a controlled manner and to collect and dispose of the emerging oil in an environmentally appropriate manner. It is also possible for a pressure measuring device, e.g. in the form of a manometer, to be connected to the hose coupling half via a measuring hose with a mating hose coupling half in order to be able precisely to determine the level of this pressure when, for example, the residual pressure indicator is indicating a pressure trapped in the attachment.

It is also possible to fit the residual pressure indicator with a further indicating function that indicates when the rated operating pressure of the attachment is exceeded. For this purpose, the tappet of the residual pressure indicator has a further marking on the rod or the indicating element actuated by a measuring element, and has a second spring. The second spring acts in the same direction as the first spring but has a higher spring constant and spring force and exerts a force on the measuring piston only when the measuring piston has been moved, by a first pressure level low in comparison with the rated operating pressure, out of the rest position into the position that indicates that the pressure present no longer permits risk-free opening of the hydraulic circuit. If the pressure present in the hydraulic circuit exceeds this first pressure level, the second spring comes to rest against the measuring piston. Only when a second pressure level corresponding approximately to the rated operating pressure is reached and the force produced by virtue of the oil pressure exceeds the sum of the forces of both springs does the measuring piston move further in the direction of the component surface and the rod project further beyond the outer end face of the main body until a second marking becomes visible. The coming into view of the second marking indicates that the rated operating pressure has been exceeded.

Demolition pincers can have arms of different shapes, one or both of which is/are mobile and driven by one or more working cylinders and can be pivoted about one or two axes. The arms can be fitted with blades for cutting sheet metal, steel sections and steel reinforcements and/or can have areas for deforming steel sections and/or teeth or rows of teeth for breaking concrete or masonry.

Pulverizers are similar in construction to demolition pincers but the arms on the mutually facing working surfaces are made wider in order to break concrete or masonry and to sever reinforcements in the construction material, such as concrete, surrounding the reinforcement.

Grabs are similar in construction to demolition pincers but have two moving grab buckets that have a skeleton structure, allowing larger quantities of construction materials to be picked up and small pieces of construction material to fall through the holes in the skeleton structure in order to sort the construction materials according to size. Grab bars are arranged at the tip of the grab buckets that touch or almost touch when the grab is closed to enable even small and thin construction materials such as wooden boards to be well gripped.

Crusher buckets have a hopper-type load space into which construction material can be introduced. Arranged within the hopper are two crusher jaws that can move relative to one another and form a tapering gap. At least one crusher jaw is pivotably mounted and can be moved toward and away from the other crusher jaw by a hydraulic cylinder or an eccentric driven by a hydraulic torque motor. The material in the gap is thereby broken and passes through the crusher bucket until it emerges in a smaller size. Instead of crusher jaws, it is also possible for one or more rotating drums having blades or bits to be arranged at the end of the hopper-type load space in order to break down the material in the loading hopper.

The invention claimed is:

1. In combination with a support device having a hydraulic circuit, a hydraulic attachment mechanically connectable to the support device and equipped to hold a residual pressure even when disconnected, the hydraulic attachment comprising:
   a hydraulic circuit connected to the hydraulic circuit of the support device when the support device is mechanically connected to the hydraulic attachment and separated therefrom when the support device is disconnected from the attachment; and
   a residual pressure indicator connected directly to the hydraulic circuit of the attachment, carried on the attachment, and displaying the pressure in the hydraulic circuit of the attachment both when same is connected to the support device and when disconnected therefrom.

2. The hydraulic attachment defined in claim 1, wherein the residual pressure indicator is integrated into the attachment and only an outer surface of the residual pressure indicator, on which an indicating element is arranged, is visible from the outside.

3. The hydraulic attachment defined in claim 2, wherein the residual pressure indicator has a main body screwed by an external thread into a location hole provided with an internal thread and formed in a component of the hydraulic attachment.

4. The hydraulic attachment defined in claim 2, wherein the residual pressure indicator has a measuring piston having a rod, the measuring piston being in a hole in the main body and movable along a longitudinal axis of the hole against the force of a spring.

5. The hydraulic attachment defined in claim 4, wherein the hole is connected to the hydraulic circuit of the attachment by a pilot hole.

6. The hydraulic attachment defined in claim 4, wherein pressure in the hydraulic circuit acts on at least one face of the measuring piston in order to produce a force counter to the force of the spring.

7. The hydraulic attachment defined in claim 4, wherein the rod projects further out of the main body with increasing pressurization of the surface of the measuring piston and retracts into the main body when the pressure is reduced.

8. The hydraulic attachment defined in claim 4, wherein the measuring piston has a stop collar that limits displacement of the measuring piston in at least one direction.

9. The hydraulic attachment defined in claim 1, wherein the residual pressure indicator is built into a cylinder head of a hydraulic breaker constituting the attachment.

10. The hydraulic attachment defined in claim 1, wherein the pressure indicator is detachably connected to the hydraulic attachment.

11. The hydraulic attachment defined in claim 1, wherein the pressure indicator is nondetachably connected to the hydraulic attachment.

* * * * *